United States Patent
Watanabe et al.

(10) Patent No.: US 6,853,881 B2
(45) Date of Patent: Feb. 8, 2005

(54) ROBOT INFORMATION PROCESSING SYSTEM

(75) Inventors: Atsushi Watanabe, Tokyo (JP); Tetsuya Kosaka, Yamanashi (JP); Yoshiharu Nagatsuka, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/112,866

(22) Filed: Apr. 2, 2002

(65) Prior Publication Data

US 2002/0147528 A1 Oct. 10, 2002

(30) Foreign Application Priority Data

Apr. 5, 2001 (JP) ........................................ 2001-107165
Apr. 17, 2001 (JP) ........................................ 2001-117708

(51) Int. Cl.⁷ ........................ G05B 15/00; G05B 19/00
(52) U.S. Cl. ........................ 700/264; 700/245; 700/256; 700/247; 700/253; 700/249; 318/568.1; 318/568.11; 318/568.12; 318/568.13; 318/568.19; 318/568.21; 318/568.22; 901/1; 901/3; 901/6; 901/15; 901/49; 901/50; 219/121.63; 219/121.64; 701/23
(58) Field of Search .................... 700/245, 256, 700/264, 247, 253, 249; 345/1.2, 158, 161, 169, 2.1; 368/680, 683; 701/23; 219/121.64, 121.63; 318/568.1, 568.11, 568.12, 568.13, 568.19, 568.21, 568.22, 567, 563, 625, 568.2; 901/3, 6, 15, 49, 50, 1

(56) References Cited

U.S. PATENT DOCUMENTS

| | | | | |
|---|---|---|---|---|
| 4,700,958 A | * | 10/1987 | Volpato | ...................... 280/842 |
| 5,705,906 A | | 1/1998 | Tanabe et al. | |
| 5,760,560 A | * | 6/1998 | Ohya et al. | .............. 318/568.1 |
| 5,930,460 A | * | 7/1999 | Noumaru et al. | ........... 700/245 |
| 5,937,143 A | * | 8/1999 | Watanabe et al. | ........... 700/264 |
| 5,949,683 A | * | 9/1999 | Akami et al. | ................ 700/123 |
| 6,019,606 A | * | 2/2000 | Yamamoto et al. | ........... 434/45 |
| RE36,631 E | * | 3/2000 | Tanabe et al. | ......... 318/568.13 |
| 6,096,994 A | * | 8/2000 | Handa et al. | ............. 219/130.5 |
| 6,107,601 A | * | 8/2000 | Shimogama | ........... 219/130.01 |

(List continued on next page.)

FOREIGN PATENT DOCUMENTS

| | | | |
|---|---|---|---|
| JP | 07-064618 | | 3/1995 |
| JP | 407096481 A | * | 3/1995 |
| JP | 08-166814 | | 6/1996 |
| JP | 408147022 A | * | 6/1996 |
| JP | 09-091017 | | 4/1997 |

(List continued on next page.)

OTHER PUBLICATIONS

KUKA, KR 3, 2001, Internet, pp. 1–4.*
Fanuc Ltd, A new robot teach pendant with Internet Interface Fanuc i Pendant, 1997–2002, Internet, p. 1.*

(List continued on next page.)

Primary Examiner—Thomas G. Black
Assistant Examiner—McDieunel Marc
(74) Attorney, Agent, or Firm—Staas & Halsey LLP (57) ABSTRACT

A robot controller executes an operating program, calculates a position and posture of a robot, and sends the position and posture information to a personal computer (PC). At the PC side, on the basis of this position and posture information, animation display information of a work cell including the position and posture of the robot is created and then sent to a teaching pendant. In the teaching pendant, the animation display information is received, and an animation image is displayed on a display section. Until the operating program is terminated, this operation is performed so that an operating animation of the robot is displayed on the display section of the teaching pendant.

37 Claims, 5 Drawing Sheets

U.S. PATENT DOCUMENTS

| | | | |
|---|---|---|---|
| 6,188,194 B1 * | 2/2001 | Watanabe et al. | 318/625 |
| 6,208,104 B1 * | 3/2001 | Onoue et al. | 318/568.11 |
| 6,218,802 B1 * | 4/2001 | Onoue et al. | 318/568.13 |
| 6,278,082 B1 * | 8/2001 | Shimogama | 219/130.5 |
| 6,356,806 B1 * | 3/2002 | Grob et al. | 700/245 |

FOREIGN PATENT DOCUMENTS

| | | | |
|---|---|---|---|
| JP | 410011122 A | * | 1/1998 |
| JP | 410146782 A | * | 6/1998 |
| JP | 411048173 A | * | 2/1999 |
| JP | 411262883 A | * | 9/1999 |
| JP | 02000288967 A | * | 10/2000 |
| JP | 2000-343466 | | 12/2000 |

OTHER PUBLICATIONS

Nilsson, Industrial robot programming, 1996, Internet, pp. 1–178.*

GE Fanuc, CNC, 2000, Newsletter/Internet, pp. 1–16.*

MOTOMAN, Motaman's JRC robot controller, offers flexibility, high performance, open communication, and ergonomic design, 2001–2002, Internet, pp. 1–2.*

Ahn et al., An off–line automatic teaching by vision information for robotic assembly task, 2000, IEEE, pp. 2171–2176.*

Nakamura et al., Multimedia communication pendant for sensor–based robotic task teachign by sharing information—Modular structure and application to sensing systems, 1998, IEEE, pp. 1166–1171.*

Mizukawa et al., Robot task design system for tool manipulation tasks, 1998, IEEE, pp. 1938–1943.*

Yuan, Interactive assembly planning in virtual environments, 2000, IEEE, pp. 1462–1467.*

Husky, Hylectric Machines, 2001, Internet pp. 1–20.*

Brantmark et al., Man/machine communication in ASEA's new robot controller, 1982, ASEA Journal vol. 55, No. 6.*

Fanuc Ltd, Multi–Purpose Intelligent Robot, 1997–2002, Internet. pp. 1–3.*

Ang Jr. et al., A woalk–through programmed robot for welding in shipyards, 1999, Internet, pp. 1–22.*

McLachlan, A virtual reality robotic simulation system, 1997, Internet, pp. 1–5.*

Fanuc, FANUC Robot i series networking, 1997, Internet, pp. 1–2.*

Wu et al., F3 Robot technical manual, 2002, Internet, pp. 1–18.*

* cited by examiner

ROBOT INFORMATION PROCESSING SYSTEM

BACKGROUND OF THE INVENTION

1. Field of the Invention

The present invention relates to an information processing system for a robot simulation and the like.

2. Description of the Prior Art

There has already been well known a system for displaying an operation of a robot according to an operating program taught to the robot on a display device as information of an animation or the like and simulating the operation of the robot so as to examine and confirm the taught operating program. However, the information of an operating animation or the like along with this simulation has been displayed on a screen of a display section of an information processing device such as a personal computer (referred to as PC, hereinafter) connected to a robot controller.

Generally, the taught operating program is simulated, the operating animation is displayed, and the operating program is examined, confirmed and further modified immediately after this operating program is taught. Teaching and modification of the operating program are performed by operating a teaching pendant (teaching operation panel), on the other hand, examining and confirming of the taught contents are performed with a PC, which are inconvenient in teaching, examining, confirming, and modifying the operating program so that there is a problem of being time consuming.

OBJECTS AND SUMMARY OF THE INVENTION

It is an object of the present invention to provide a robot information processing system capable of displaying information stored in a PC on a teaching pendant and operating the information from the teaching pendant.

A robot information processing system according to a first aspect of the present invention comprises a robot controller comprising a teaching pendant and an information processing device provided separately from the robot controller, wherein the information processing device comprises means for directly or indirectly (for example, via the robot controller) sending information stored in the information processing device to the teaching pendant, and the teaching pendant comprises means for displaying the information on a display section of the teaching pendant on the basis of the information.

A robot information processing system according to a second aspect of the present invention comprises a robot controller comprising a teaching pendant and an information processing device provided separately from the robot controller, wherein the information processing device generates display information for displaying a robot operation in a form of animation on the basis of operating position information of a robot sent from the robot controller. Further, the generated display information is directly or indirectly (for example, via the robot controller) sent from the information processing device to the teaching pendant to be displayed in a form of animation on a display section of the teaching pendant.

Accordingly, the teaching pendant displays part of or all the display information sent from the information processing device on the display section. Further, there is provided means for operating a robot simulation performed by the information processing device from the teaching pendant so that the robot simulation can be operated also from the teaching pendant. Furthermore, there is provided operating means for operating for various information for a display stored in the information processing device also from the teaching pendant. The means for operating for various information for this display displays a guidance for information modifying for the display on a display section of the teaching pendant.

Further, in the teaching pendant or the information processing device, there is provided means for selecting either one or both a first operating mode for sending operating position information from the robot controller to a robot main body to cause the robot to operate, and a second operating mode for sending the operating position information from the robot controller to the information processing device to generate display information for displaying a robot operation in a form of animation.

Further, the robot information processing system is configured such that, when the second operating mode is selected, immediately before the robot controller sends first operating position information to the information processing device, information representing the state of the robot controller at that time is sent to the information processing device to be stored in storage means of the information processing device, and, after the animation display in the second operating mode is terminated, the information processing device sends back the information to the robot controller so that the robot controller can be returned back to the state immediately before the first operating position information is sent.

According to the present invention, since the operating program is simulated so that the operating animation of the robot on the basis of the operating program can be displayed also on the teaching pendant, the operating program can be efficiently taught and modified.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
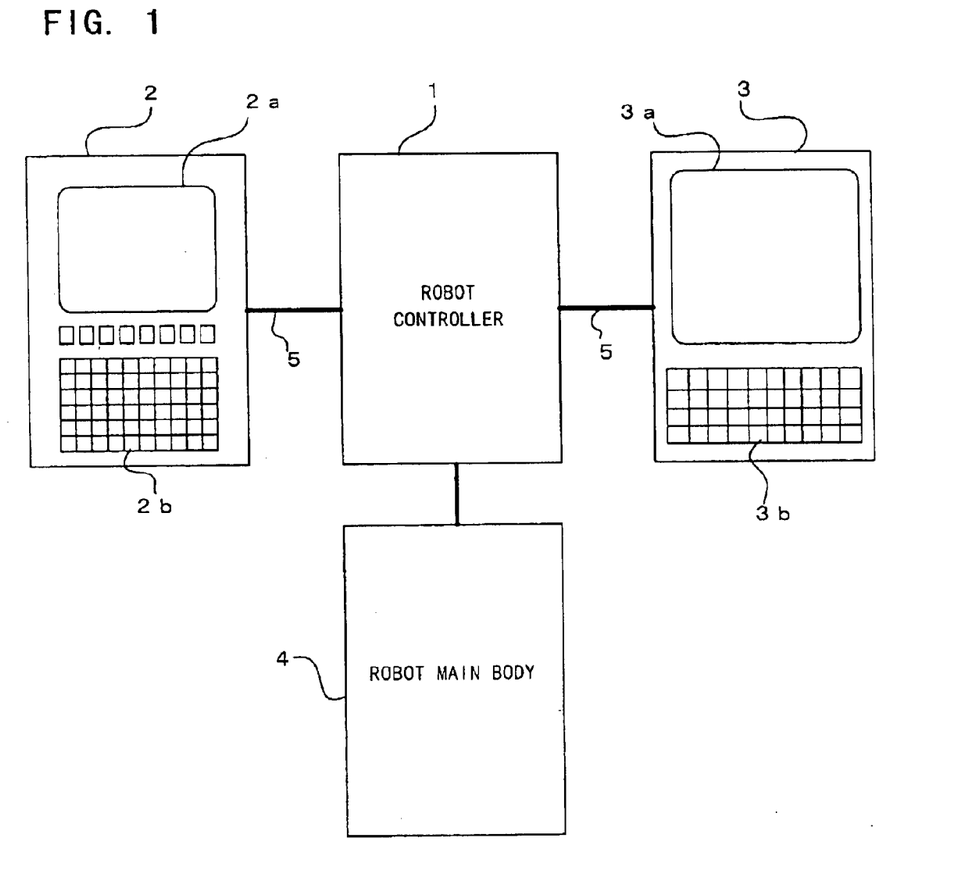
FIG. 1 is a configuration diagram according to an embodiment of the present invention.

FIG. 1 is a schematic diagram according to an embodiment of the present invention. Robot mechanism sections of a robot main body 4 are connected to a robot controller 1. The robot controller 1 controls the robot main body 4 and drives each mechanism section such as an arm or the like of the robot to cause the robot to operate. The above aspects are not different from those in a conventional robot.

Further, to this robot controller 1 are connected a teaching pendant 2 and a PC 3 as an information processing device via a cable 5. This connection is conducted via an Ethernet cable or a RS-422 cable. When this cable 5 is configured with the Ethernet cable, information can be directly exchanged between the teaching pendant 2 and the PC 3, on the other hand, when the cable 5 is configured with the RS-422 cable, information is indirectly exchanged between the teaching pendant 2 and the PC 3 via the robot controller 1. In addition, when a plurality of PCs are connected to the robot controller 1, a target PC for acquiring information may be selected in the teaching pendant 2.

The teaching pendant 2 comprises a display section 2a which is configured with a liquid crystal or the like, and an operating section 2b which is configured with software keys, keys for inputting various instructions, or the like. In association with the present invention, in this operating section 2b, there are particularly provided (1) a key for instructing to activate and stop an operating simulation, (2) an operating mode switch for selecting whether or not to instruct an instruction value of the robot for driving the robot main body to either one of or both a servo section for driving and controlling a servo motor of each shaft and the PC 3, (3) a display condition modifying instruction key for setting and modifying display condition data of an animation stored in the PC 3, and (4) a display operating mode changeover switch for enabling to perform an operation for the operating simulation in either one of or both this teaching pendant 2 and the PC 3.

The PC 3 comprises a display section 3a and an operating section 3b such as a keyboard or the like. In association with the present invention, in the operating section 3b, there are particularly provided (1) a key for instructing to activate and stop the operating simulation, (2) an operating mode switch for selecting whether or not to instruct the instruction value of the robot to either one or both the servo section for driving the robot main body 4 and the PC 3, and (3) a display operating mode changeover switch for selecting an operation concerning the animation, and the like.

Further, the PC 3 may be stored inside a cabinet of the robot controller 1.

Figure 2:
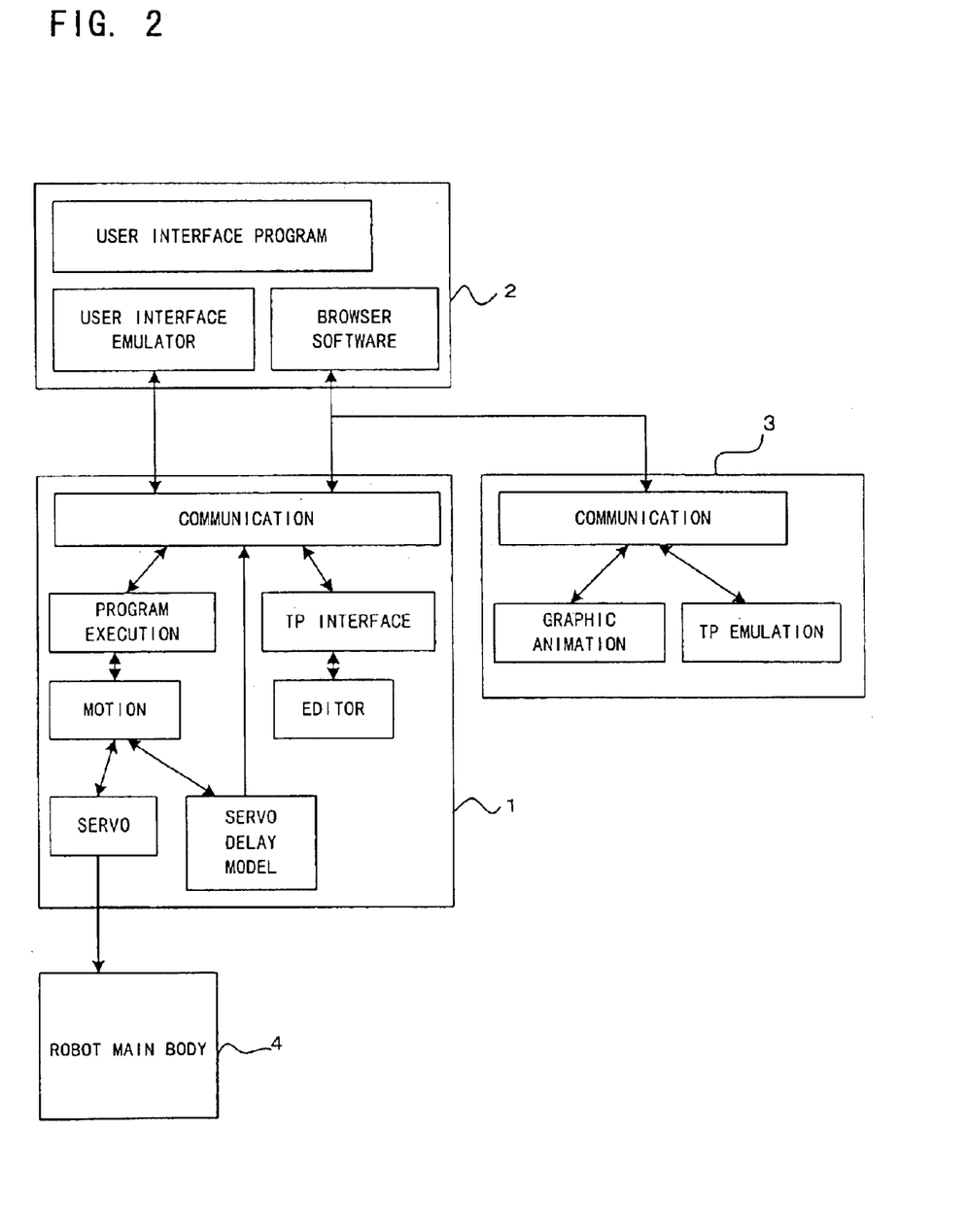
FIG. 2 is a software configuration diagram according to the embodiment of the present invention.

FIG. 2 is an explanatory diagram showing a software configuration of the robot controller 1, the teaching pendant 2 and the PC 3 according to the present invention.

The robot controller 1 is configured with a communication interface, a motion section for creating operating position information of the robot on the basis of a software for a program execution processing and an execution of the program, a servo section for driving and controlling the servo motor of each shaft or the like of the robot mechanism section 4 on the basis of the operating position information from the motion section, a servo delay model for acquiring the operating position information for the animation in which a servo delay system is compensated, a teaching pendant (TP) interface, an editor, and the like.

Further, the teaching pendant 2 comprises a user interface program, a user interface emulator, a browser software, and the like.

The PC 3 comprises a communication interface, a graphic animation, a teaching pendant (TP) emulation, and the like.

FIG. 2 shows an example in which the robot controller 1, the teaching pendant 2 and the PC 3 are connected via the Ethernet cable 5.

Figure 3:
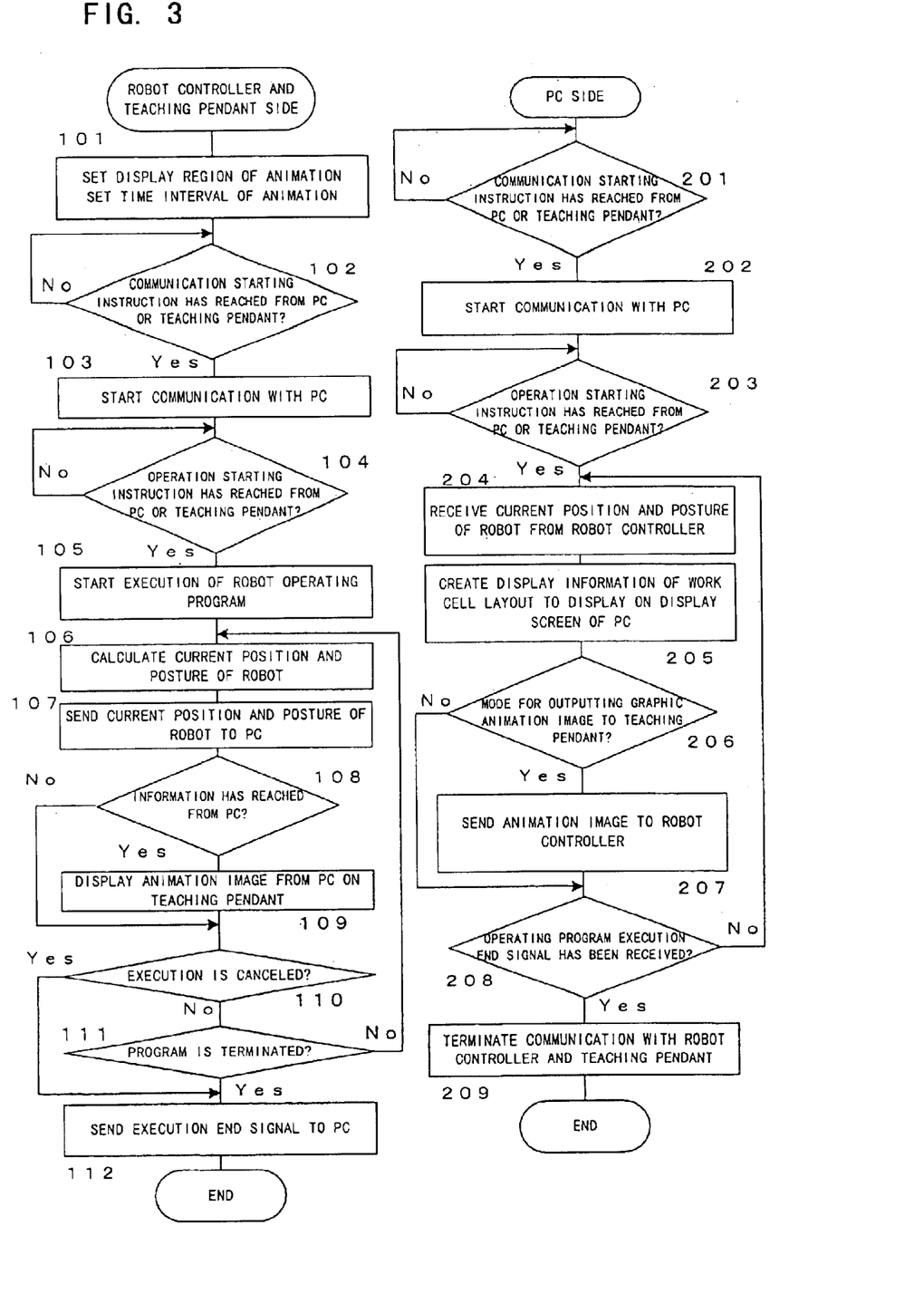
FIG. 3 is a flow chart showing an operation processing algorism according to a first embodiment of the present invention.

FIG. 3 is a flow chart which shows a processing which is performed when an operating mode selecting switch provided in the teaching pendant 2 or the PC 3 is selected to a mode for issuing an instruction of the robot to the PC 3 or both the PC 3 and the servo section, showing a processing for displaying in a form of animation to simulate the operation of the robot in the operating program on the display section 2a of the teaching pendant 2. The processings from step 101 to step 112 in this flow chart are the processings in the robot controller 1 and the teaching pendant 2, and the processings from step 201 to step 209 show the processings in the PC 3.

At first, the processings in the robot controller 1 and the teaching pendant 2 will be explained.

A display region of the animation and a time interval of the animation in the display section 2a of the teaching pendant 2 which have been inputted and stored in advance are set (step 101). Then, the operating section 3b of the PC 3 is operated, a determination is made on whether or not a communication starting instruction has been inputted to be sent, or the communication starting instruction has been inputted according to the operation of the operating section 2b of the teaching pendant 2 (step 102). Until this communication starting instruction is inputted, the following processings are not performed. When this communication starting instruction is inputted, a communication with the PC 3 is started (step 103), and a determination is made on whether or not an operation starting instruction has been inputted from the PC 3 or the teaching pendant 2 (step 104). In the case where the display operating mode changeover switch provided in the teaching pendant 2 or the PC 3 has been switched to enable an operation of the simulation in either one of the teaching pendant 2 and the PC 3, this operation starting instruction can be inputted only from the selected teaching pendant 2 or PC 3.

When the operation starting instruction is inputted, the execution of the robot operating program is started (step 105), a position and posture of the robot at the current time are calculated on the basis of the robot operating program and the servo delay model (step 106), and the calculated robot position and posture data (that is, operating position information) is sent to the PC 3 via the cable 5 (step 107). When the operating mode switch is selected to instruct the operating position information to both the PC 3 and the servo section, the operating position information which is acquired by analyzing the operating program is output also to the servo section, and the servo motor of each shaft of the robot main body 4 is driven to cause the robot to operate.

On the other hand, after the current position and posture information is sent to the PC 3, as described later, a determination is made on whether or not display information of the animation created with a graphic animation software of the PC 3 has reached (step 108). When the display information of the animation has not reached, a process proceeds to step 110. When this display information has reached, an animation image is displayed on the display section 2a of the teaching pendant 2 according to this display information (step 109). This animation image is displayed on the display region which is set in step 101. However, an animation image outside this display region is not displayed, in some cases, only part of animation image is displayed. Further, of course, all the animation image may be displayed.

After the animation image is displayed on the display section 2a of the teaching pendant 2, a determination is made on whether or not an execution cancel instruction has been inputted (step 110). When the execution cancel instruction has not been inputted, a determination is further made on whether or not the operating program has been terminated (step 111). When the operating program has not been terminated, the process returns back to step 106, and the aforementioned processings are repeatedly performed. In addition, the execution cancel instruction can be issued only from the teaching pendant 2 or PC 3 selected according to the display operating mode changeover switch.

Hereinafter, the aforementioned operations are repeatedly performed so that the simulation of the robot operation according to the operating program is displayed on the display section 2a of the teaching pendant 2 as the animation of the robot operation.

When the execution cancel instruction is inputted (step 110: Yes) or the operating program is terminated (step 111: Yes), the operating program execution is terminated, and an end signal of this program execution is sent to the PC 3 (step 112).

Next, the processings of the PC 3 will be explained.

Similarly to the processing in step 102, a determination is made on whether or not the communication starting instruction has been inputted from the PC 3 or the teaching pendant 2. When the communication starting instruction has been inputted, a communication with the robot controller 1 is started (step 202).

Next, similarly to the processing in step 104, a determination is made on whether or not the operation starting instruction has been inputted from the PC 3 or the teaching pendant 2 (step 203). If the operation starting instruction has been inputted, the position and posture data of the robot at the current time, which is sent from the robot controller 1 through the processing in step 107, is received (step 204), a layout image of this work cell and the display information representing the position and posture of the robot at the current time are created on the basis of layout data of peripheral devices, accessories and the like in a work cell, set in advance, in which this robot is arranged, and the display information is displayed on the display section 3a of the PC 3 on the basis of this display information (step 205).

In addition, the display conditions for this image display such as a coordinate system, colors displayed, sizes of lines, and the like set and stored in storage means of the PC 3 can be set and modified in the PC 3, but they can also be modified by using the display condition modifying instruction key provided in the aforementioned teaching pendant 2. When this display condition modifying instruction key is operated, a guidance for modifying and setting is displayed on the display section 2a of the teaching pendant 2 so that these items of data can be modified and set by using the software key (function key) and the like.

Next, a determination is made on whether or not a mode for displaying this displayed graphic image also on the teaching pendant 2 has been set (step 206), and when the mode has not been set, the process proceeds to step 208. On the other hand, when the mode for displaying also in the teaching pendant 2 has been set, this image data, that is, display information of the animation image, is sent to the robot controller 1 or the teaching pendant 2 (step 207). In the above step 109, this sent display information of the animation image is received in the robot controller 1 or the teaching pendant 2.

Next, a determination is made on whether or not an operating program execution end signal sent according to the processing of the robot controller 1 and the teaching pendant 2 in step 112 has been received (step 208), and when the signal has not been received, the process returns back to step 204, where the aforementioned processings are repeatedly performed.

As a result, when the mode for displaying the animation image is selected, the operating animation of the robot along with the operating program is displayed on the display section 3a of the PC 3 and the display section 2a of the teaching pendant 2.

When the operating program is terminated (step 208: Yes), and the execution end signal is sent according to the processing in step 112 from the robot controller 1 or the teaching pendant 2, the communication between the robot controller 1 and the teaching pendant 2 is terminated (step 209), and this processing is terminated.

As described above, the position and posture information (that is, operating position information) of the robot along with the operating program is sent from the robot controller 1 to the PC 3, the work cell and the animation image of the position and posture of the robot are created according to the graphic animation processing in the PC 3, this image data is directly sent (when the Ethernet cable is used) or indirectly sent (when the RS-422 cable is used) via the robot controller 1 to the teaching pendant 2 to display the operating animation of the robot on the display section 2a of the teaching pendant 2.

Since the operating animation image of the robot can be watched in the display section 2a of the teaching pendant 2, when the operating program is taught or the operating program is modified, this simulation is performed so that the operating state of the robot when the taught or modified operating program is executed can be immediately confirmed on the teaching pendant 2 so that the operating program can be efficiently taught and modified.

Figure 4:
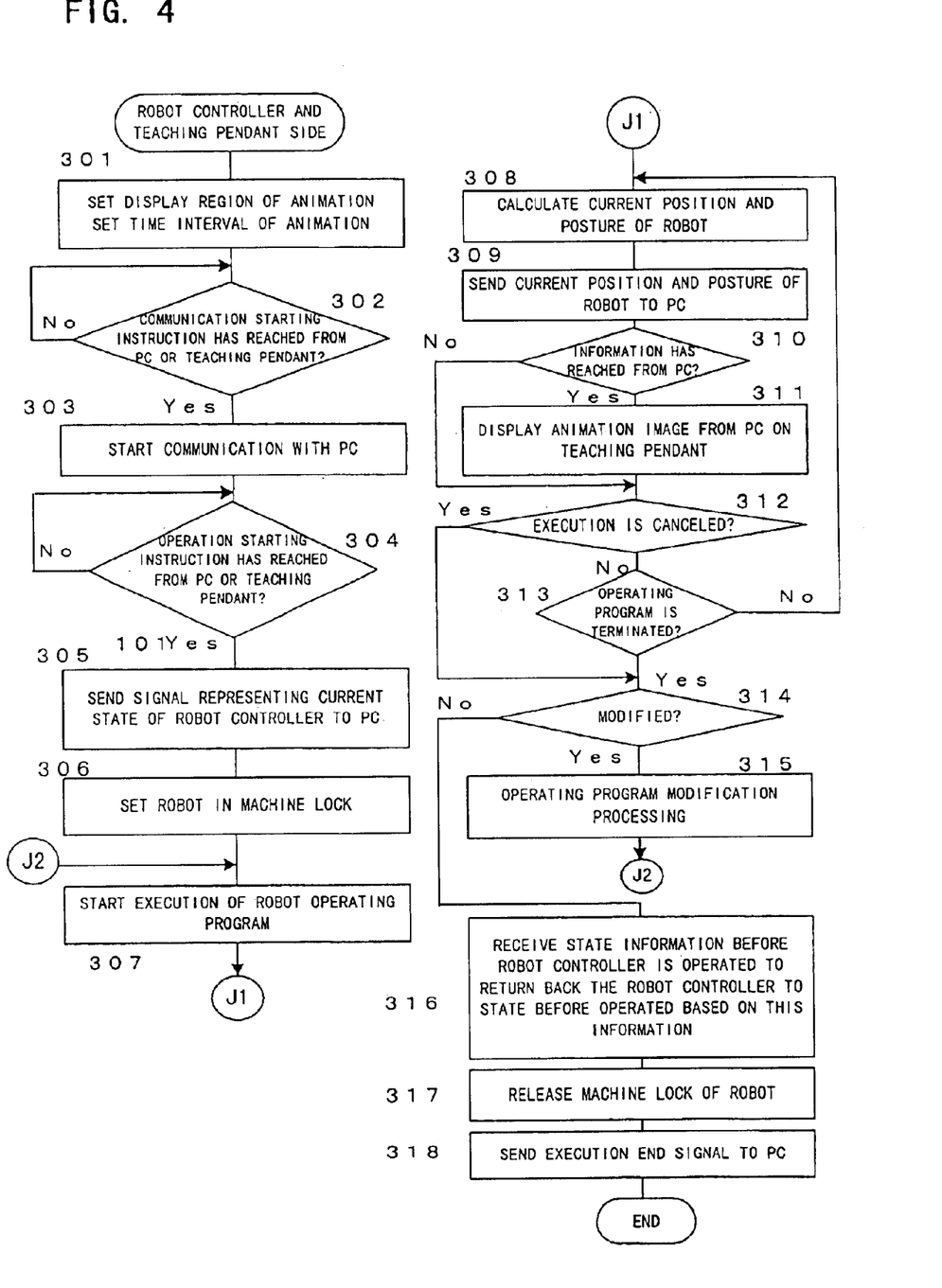
FIG. 4 is a flow chart showing an operation processing algorism of a robot controller and a teaching pendant according to a second embodiment of the present invention.
Figure 5:
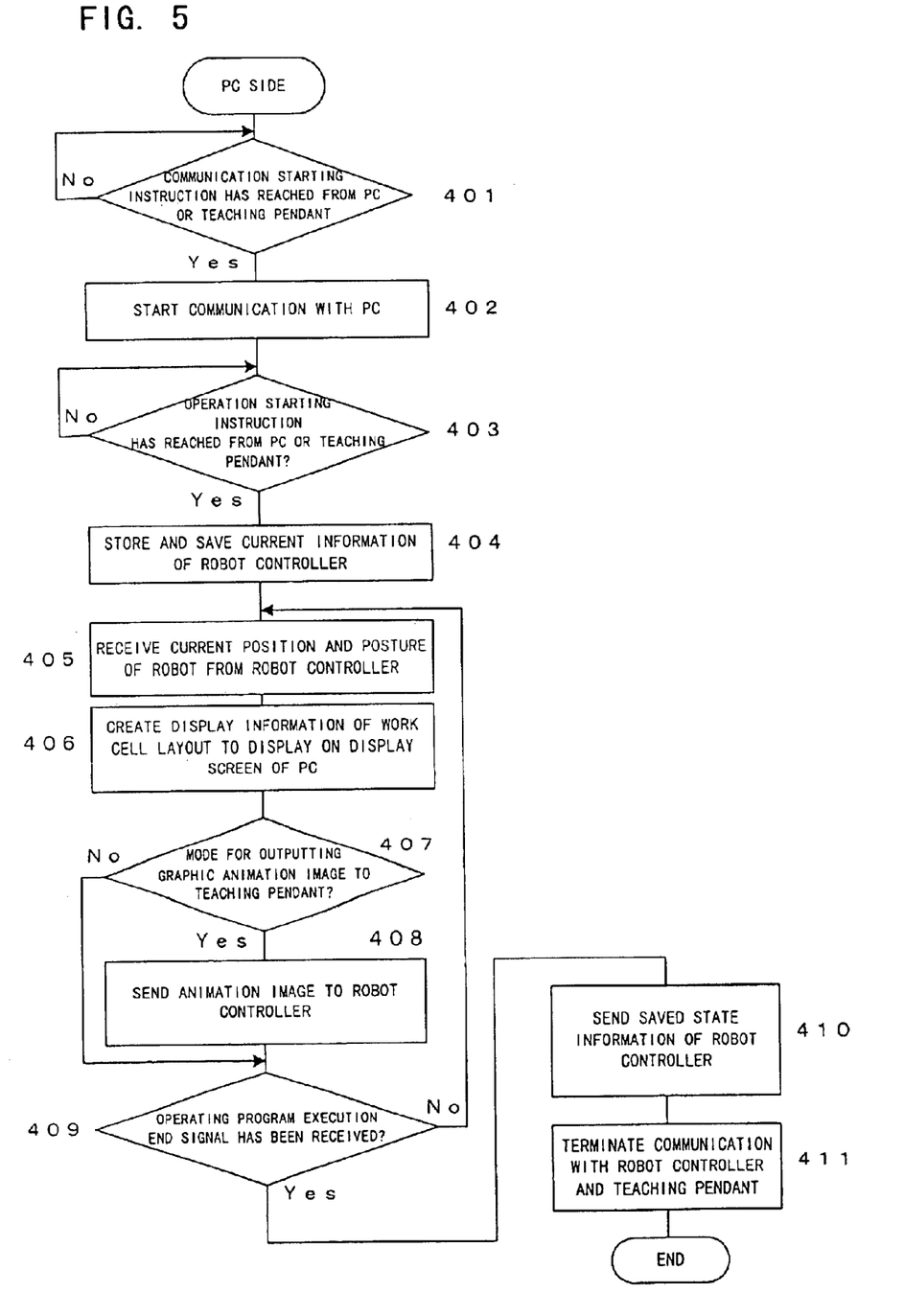
FIG. 5 is a flow chart showing an operation processing algorism of a personal computer according to the second embodiment of the present invention.

FIGS. 4 and 5 are flow charts of the processings of the robot controller 1 and the teaching pendant 2 and the processing of the PC 3 for animation displaying in the robot operating simulation according to a second embodiment of the present invention. In this second embodiment, there is configured such that the state of the robot controller before the robot is operated for simulation is reproduced after the simulation operating is performed, which is different from the first embodiment.

FIG. 4 shows the processings in the robot controller 1 and the teaching pendant 2 in which the processings from step 301 to step 304 are identical to the processings from step 101 to step 104 shown in FIG. 3.

In this second embodiment, when the operation starting instruction is inputted, at first, all the signals representing the operating state of the robot controller 1 at that time such as the current state of the robot controller 1, the position and the posture of the robot, the state of the input/output signal and the like are sent to PC 3 (step 305), so that the robot is machine-locked and set in a non-operating state (step 306). Thereafter, similarly to the first embodiment, the processings from step 307 to step 313 identical to those from step 105 to step 111 in the flow chart of FIG. 3 are performed.

In other words, the robot operating program execution is started, the robot position and posture at the current time are calculated and the calculated position and posture are sent to the PC 3. When the animation image data is reached from the PC 3, the image is displayed on the display section 2a of the teaching pendant 2. Then, a determination is made on whether or not the operating cancel instruction has been inputted and whether or not the operating program has been terminated, and, until the cancel instruction is inputted or the operating program is terminated, the processing for sending the operating position information representing the current position and posture of the robot and the processing for displaying the robot animation image sent from the PC 3 on the teaching pendant 2a (step 308 to step 313) are repeatedly performed.

When the cancel instruction is inputted (step 312: Yes) or the operating program is terminated (step 313: Yes), a determination is made on whether or not, from the teaching pendant 2 or the PC 3, the modification starting instruction of the operating program is inputted or an instruction of "OK" has been inputted without modifying the operating program (step 314). When the modification has not been performed, the process proceeds to step 316. On the other hand, the modification has been performed, the process proceeds to step 315, where the modification processing of the operating program is performed (step 315). When the modification processing is terminated, the process proceeds to step 307, where the modified robot operating program is executed, so that the aforementioned processings from step 308 to step 313 are repeatedly performed.

As described above, when the operating program has not been modified (step 314: Yes), the process proceeds from step 314 to step 316, where the information sent in step 305 and stored in the PC 3 is read out, and, on the basis of this information, the robot controller is returned back to the state before the simulation is started, the machine lock of the robot is unlocked (step 317), and the operating program execution end signal is sent to the PC 3 (step 318).

FIG. 5 is a flow chart showing the processing of the PC 3 according to the second embodiment. The processing of the PC 3 according to the second embodiment is different from the processing of the PC 3 according to the first embodiment in that steps 404 and 410 are added to the flow chart of the PC 3 according to the first embodiment.

The steps 401 to 403 are identical to the steps 201 to 203 according to the first embodiment. Further, the processings from steps 405 to 409 are identical to the processings from steps 204 to 208 according to the first embodiment. Furthermore, the processing in step 411 is identical to the processing in step 209 according to the first embodiment.

In other words, in the second embodiment, when the communication between the robot controller 1, the teaching pendant 2 and the PC 3 is started and the operation starting instruction is inputted (steps 401 to 403), at first, the information representing the state of the robot controller 1 at the present time, which is sent from the robot controller 1, is stored and saved (step 404). Thereafter, the display information of the animation image of the robot operation, which changes according to execution of the above operating program, is created, and on the basis of this information, the animation image is displayed on the display section 3a of the PC 3. Further, when the mode for displaying the animation image is set in the teaching pendant, the animation image is sent also to the teaching pendant 2, and the robot operating animation is displayed on the teaching pendant 2a (steps 405 to 409).

When the operating program execution end signal is received (step 409), the information representing the state of the robot controller before the animation operating is started, which has been stored in step 404, is sent to the robot controller 1 (step 410), the communication between the robot controller 1 and the teaching pendant 2 is terminated (step 411).

In the second embodiment, as described above, after the robot operation is simulated and displayed in a form of the animation, the robot controller 1 can be returned back to the state before the simulation is started. In the middle of the processing, when the simulation is performed to confirm the operation with the robot animation, the robot controller can be configured to be returned back to the original state after the operation is confirmed.

What is claimed is:

1. A robot information processing system comprising a robot controller having a teaching pendant and an information processing device provided separately from the robot controller,
   where the robot controller, the teaching pendant, and the information processing device share a bi-directional communication path,
   wherein the information processing device comprises means for directly or indirectly sending information stored in the information processing device via the bi-directional communication path to the teaching pendant, where the stored information is based on control information received at the information processing device from the teaching pendant via the bi-directional communication path, and
   the teaching pendant comprises means for displaying the information on a display section of the teaching pendant on the basis of the information.

2. A robot information processing system comprising a robot controller having a teaching pendant and an information processing device provided separately from the robot controller,
   where the robot controller, the teaching pendant, and the information processing device share a bi-directional communication path,
   wherein the information processing device comprises means for sending information stored in the information processing device via the robot controller to the teaching pendant, where the robot controller functions as the bi-directional communication path between the teaching pendant and the information processing device, and where the stored information is based on control information received at the information processing device from the teaching pendant via the bi-directional communication path, and
   the teaching pendant comprises means for displaying the information on a display section of the teaching pendant on the basis of the information.

3. A robot information processing system comprising a robot controller having a teaching pendant and an information processing device provided separately from the robot controller,
   where the robot controller, the teaching pendant, and the information processing device share a bi-directional communication path,
   wherein the information processing device generates display information for displaying a robot operation in a form of animation on the basis of operating position information of a robot sent from the robot controller to the information processing device via the bi-directional communication path, and
   the robot information processing system comprises means for directly or indirectly sending the generated display information from the information processing device via the bi-directional communication path to the teaching pendant, where the display information is based on control information received at the information processing device from the teaching pendant via the bi-directional communication path, and
   the teaching pendant displays the display information in a form of animation on a display section of the teaching pendant on the basis of the display information.

4. A robot information processing system comprising a robot controller having a teaching pendant and an information processing device provided separately from the robot controller, where the robot controller, the teaching pendant, and the information processing device share a bi-directional communication path, wherein the information processing device generates display information for displaying a robot operation in a form of animation on the basis of operating position information of a robot sent from the robot controller to the information processing device via the bi-directional communication path, and the robot information processing system comprises means for sending the generated display information from the information processing device via the robot controller to the teaching pendant, where the robot controller functions as the bi-directional communication path between the information processing device and the teaching pendant, and where the display information is based on control information received at the information processing device from the teaching pendant via the bi-directional communication path, and, the teaching pendant comprises means for displaying the display information in a form of animation on a display section of the teaching pendant on the basis of the display information.

5. The robot information processing system according to any one of claims 1 to 4, wherein the teaching pendant displays part of the information sent from the information processing device on the display section.

6. The robot information processing system according to claim 5, wherein information sent from the information processing device is directed for simulating a robot operation, and the teaching pendant displays part of the simulation on the display section.

7. The robot information processing system according to claim 6, comprising means for operating a robot simulation performed by the information processing device from the teaching pendant.

8. The robot information processing system according to any one of claims 1 to 4, comprising means for operating information processing performed by the information processing device from the teaching pendant.

9. The robot information processing system according to any one of claims 1 to 4, wherein the teaching pendant comprises means for performing operation for various information for a display stored in the information processing device.

10. The robot information processing system according to claim 9, wherein said means for performing operations for various information for the display displays a guidance for information modifying for a display on a display section of the teaching pendant.

11. The robot information processing system according to any one of claims 1 to 4, wherein the information processing device comprises means for selecting either one or both a first operating mode for sending operating position information from the robot controller to an amplifier of a motor of a robot to cause the robot to operate, and a second operating mode for sending the operating position information from the robot controller to the information processing device to generate display information for displaying a robot operation in a form of animation.

12. The robot information processing system according to any one of claims 1 to 4, wherein the teaching pendant comprises means for selecting either one or both a first operating mode for sending operating position information from the robot controller to an amplifier of a motor of a robot to cause the robot to operate, and a second operating mode for sending the operating position information from the robot controller to the information processing device to generate display information for displaying a robot operation in a form of animation.

13. The robot information processing system according to claim 11, wherein, when the second operating mode is selected, before the robot controller sends a first operating position information to the information processing device, the robot controller sends information representing the state of the robot controller at the present time from storage means of the robot controller to the information processing device to store in storage means of the information processing device, and, after an animation display is terminated in the second operating mode, the information processing device sends back the information to the robot controller, thereby returning back to the state immediately before the robot controller sends a first operating position information.

14. The robot information processing system according to claim 12, wherein, when the second operating mode is selected, before the robot controller sends a first operating position information to the information processing device, the robot controller sends information representing the state of the robot controller at the present time from storage means of the robot controller to the information processing device to store in storage means of the information processing device, and, after an animation display is terminated in the second operating mode, the information processing device sends back the information to the robot controller, thereby returning back to the state immediately before the robot controller sends a first operating position information.

15. The robot information processing system according to any one of claims 1 to 4, wherein the information processing device is stored inside a cabinet of the robot controller.

16. The robot information processing system according to any one of claims 1 to 4, wherein a plurality of the information processing devices are provided, and the teaching pendant comprises means for selecting one of the plurality of information processing devices.

17. A robot information processing system comprising a robot controller having a teaching pendant and an information processing device provided separately from the robot controller, where the robot controller, the teaching pendant, and the information processing device share a bi-directional communication path, the information processing device sends information stored in the information processing device to the teaching pendant, and where the teaching pendant displays part of the information on a display section of the teaching pendant on the basis of the information.

18. A robot information processing system according to claim 17, wherein the information processing device generates display information for displaying a robot operation in a form of animation on the basis of operating position information of a robot sent from the robot controller to the information processing device, wherein the information sent by the information processing device and displayed by the teaching pendant comprises the display information, and wherein the teaching pendant displays an animation on the display section of the teaching pendant on the basis of the display information.

19. A robot processing system according to claim 17, wherein the information processing device sends the information directly or indirectly to the teaching pendant.

20. A robot processing system according to claim 17, wherein the information processing device sends the information via the robot controller to the teaching pendant.

21. A robot processing system according to claim 17, wherein the information processing device responds to control information sent to it by the teaching pendant via the bidirectional communication path.

22. A robot information processing system according to claim 17, wherein information sent from the information processing device is directed to simulating a robot operation, and the teaching pendant displays part of the simulation on the display section.

23. A robot information processing system according to claim 17, comprising means for operating a robot simulation performed by the information processing device from the teaching pendant.

24. A robot information processing system comprising a robot controller having a teaching pendant and an information processing device provided separately from the robot controller,
where the information processing device sends information stored in the information processing device to the teaching pendant via a bi-directional communication path shared by the robot controller, the teaching pendant, and the information processing device, where
the teaching pendant displays part of the information on a display section of the teaching pendant on the basis of the information, where the teaching pendant operates upon various information for a display stored in the information processing device, and where the operating upon the various information for the display comprises displaying a guidance for information modifying for a display on the display section of the teaching pendant.

25. A robot information processing system according to claim 24, wherein the information processing device generates display information for displaying a robot operation in a form of animation on the basis of operating position information of a robot sent from the robot controller to the information processing device,
wherein the information sent by the information processing device and displayed by the teaching pendant comprises the display information, and wherein
the teaching pendant displays an animation on the display section of the teaching pendant on the basis of the display information.

26. A robot processing system according to claim 24, wherein the information processing device sends the information directly or indirectly to the teaching pendant.

27. A robot processing system according to claim 24, wherein the information processing device sends the information via the robot controller to the teaching pendant.

28. A robot processing system according to claim 24, wherein the information processing device and the teaching pendant share a bidirectional communication path, and wherein the information processing device responds to control information sent to it by the teaching pendant via the bidirectional communication path.

29. A robot information processing system according to claim 24, wherein information sent from the information processing device is directed to simulating a robot operation, and the teaching pendant displays part of the simulation on the display section.

30. A robot information processing system according to claim 24, comprising means for operating a robot simulation performed by the information processing device from the teaching pendant.

31. A robot information processing system comprising a robot controller having a teaching pendant and an information processing device provided separately from the robot controller, where
the robot controller, the teaching pendant, and the information processing device share a bi-directional communication path, where
the information processing device sends information stored in the information processing device via the bi-directional communication path to the teaching pendant, where the stored information is based on control information received at the information processing device from the teaching pendant via the bi-directional communication path, and where
the teaching pendant displays the information on a display section of the teaching pendant on the basis of the information.

32. A method of controlling a robot information processing system comprising a robot controller having a teaching pendant and an information processing device provided separately from the robot controller, the method comprising:
operating the robot controller or a program executing therein by sending operation information from the teaching pendant to the robot controller via a bi-directional communication path;
responsive to the operating of the robot controller by the teaching pendant, sending output from the robot controller to the information processing device via the bi-directional communication path; and
at the information processing device, generating animation information based on the output of the robot controller and sending the animation information from the information processing device to the teaching pendant via the bi-directional communication path.

33. A machine-readable storage storing information for enabling the information processing device to perform respective procedures of the method of claim 32.

34. A machine-readable storage storing information for enabling the robot controller to perform respective procedures of the method of claim 32.

35. A machine-readable storage storing information for enabling the teaching pendant to perform respective procedures of the method of claim 32.

36. A machine-readable storage storing information for enabling the robot information system to perform the method of claim 32.

37. A method according to claim 32, further comprising:
from the teaching pendant, sending to the information processing device, via the bi-directional communication path, information to control the generating of the animation information.

* * * * *

UNITED STATES PATENT AND TRADEMARK OFFICE
CERTIFICATE OF CORRECTION

PATENT NO. : 6,853,881 B2
DATED : February 8, 2005
INVENTOR(S) : Atsushi Watanabe et al.

It is certified that error appears in the above-identified patent and that said Letters Patent is hereby corrected as shown below:

Column 9,
Line 49, change "a" to -- the --.

Column 10,
Lines 13 and 18, delete "paragraph return".

Signed and Sealed this

Thirty-first Day of January, 2006

JON W. DUDAS
*Director of the United States Patent and Trademark Office*